United States Patent [19]
Suzuki et al.

[11] 3,801,455
[45] Apr. 2, 1974

[54] METHOD FOR PRODUCING CITRIC ACID
[75] Inventors: Takashi Suzuki; Yasuhiro Sumino, both of Hyogo; Shunichi Akiyama, Kyoto; Hideo Fukuda, Osaka, all of Japan
[73] Assignee: Takeda Chemical Industries, Ltd., Osaka, Japan
[22] Filed: July 2, 1971
[21] Appl. No.: 159,461

Related U.S. Application Data
[63] Continuation-in-part of Ser. No. 130,851, April 2, 1971, abandoned.

[52] U.S. Cl................ 195/28 R, 195/32, 195/36, 195/47
[51] Int. Cl............................................. C12b 1/00
[58] Field of Search............. 195/36, 37, 47, 28, 80

[56] References Cited
UNITED STATES PATENTS
3,717,549  2/1973  Roberts.................... 195/37
3,189,527  6/1965  Lockwood et al.............. 195/36 R FOREIGN PATENTS OR APPLICATIONS
1,808,615  7/1969  Germany Primary Examiner—A. Louis Monacell
Assistant Examiner—R. B. Penland
Attorney, Agent, or Firm—Wenderoth, Lind & Ponack

[57] ABSTRACT

This invention relates to a method for producing citric acid, which comprises incubating a yeast, a mold or a bacterium whose growth is inhibited by a citric acid-antimetabolite or a precursor thereof and which is capable of accumulating a significant amount of citric acid in a cultured medium, and then recovering citric acid thus accumulated from said medium.

26 Claims, No Drawings

METHOD FOR PRODUCING CITRIC ACID

This is a continuation-in-part of Ser. No. 130,851 filed Apr. 2, 1971, now abandoned.

This invention relates to a method for producing citric acid, which is in a great demand and used for example, as an acidulant in beverage and in pharmaceutical preparations.

It has been reported that certain yeasts, when cultivated, accumulate citric acid and (+)-isocitric acid but the yields of those acids relative to the carbon sources consumed are not necessarily satisfactory. In addition, as (+)-isocitric acid is concomitantly produced, a substantially corresponding reduction takes place in the yield of critic acid.

Furthermore, the necessity to separate citric acid from (+)-isocitric acid requires an additional procedure which causes a further decrease in the yield of citric acid.

From economic and industrial points of view, therefore, the foregoing is not a satisfactory process for the production of citric acid.

The present inventors conducted an extensive study of the organic acid metabolism of microorganisms and isolated a large number of microorganisms possessing unique metabolic characters.

In the course of this study, it was discovered that, among thus isolated microorganisms, there were some having significantly increased capacity to accumulate citric acid accompanied by their suppressed ability of accumulating (+)-isocitric acid, and the growth of these microorganisms are inhibited by a critic acid-antimetabolite or its precursor.

Those findings were followed by further intensive research, which has culminated in the perfection of this invention.

Thus, the present invention relates to

1. A method for producing citric acid, which comprises incubating a yeast, a mold or a bacterium whose growth is inhibited by a citric acid-antimetabolite or a precursor thereof and which is capable of accumulating a significant amount of citric acid in a culture medium and, then, recovering citric acid thus accumulated from said medium; and 2. A method for producing citric acid which comprises inoculating both a medium containing a citric acid-antimetabolite or a precursor thereof and a medium free from such an antimetabolite or a precursor with a yeast, a mold or a bacterium to select a strain whose growth is inhibited on the former medium but grows well on the latter medium, then, incubating this particular strain in a medium to cause the same to accumulate citric acid in the medium and, finally recovering the citric acid thus accumulated from said medium.

"The inhibition of growth" as referred to above depends upon various cultural factors including the particular strain employed, the composition and concentration of the medium and so forth but, in the scope of this invention, the term means:

1. In the case of a strain of microorganism whose growth is inherently inhibited by a citric acid-antimetabolite or its precursor, the situation in which the rate of growth of said strain in the presence of not less than 1 millimole of such a substance is suppressed in a statistically significant level and practically suppressed to not more than 75 percent of its rate of growth in the absence of the same substance, regardless of cultural factors.

2. In the case of a mutant strain of microorganism which has been derived from a parent strain inherently fairly resistant to a citric acid-antimetabolite or its precursor but, by mutation, has acquired a sensitivity to such a substance, the situation in which the growth rate of the mutant has been suppressed in a statistically significant level and suppressed practically to not more than 75 percent of that of the parent strain at the highest concentration of said substance that does not inhibit the growth of the parent strain at all, regardless of cultural factors.

The present metnod offers many advantages over hitherto known methods. In the first place, the present process gives an extremely higher yield. Secondly, since the by-product (+)-isocitric acid is absent or occurs only in a trace amount, the purification of critic acid is simplified, with the result that not only the purification yield but also the quality of the final product is enhanced.

Thus, the main object of the present invention is to provide a method for producing citric acid in a good yield.

Another object of the present invention is to provide a process to select a microorganism capable of producing citric acid in a high yield.

Further object of the present invention is to facilitate the purification procedure of the objective citric acid.

This invention is carried out with the employment of, as afore-mentioned, any member selected from the group consisting of a yeast, a mold, and a bacterium whose growth is inhibited by a citric acid antimetabolite or its precursor and which is capable of extracellularly accumulating a significant amount of citric acid, irrespective of whether the microorganism is one which has been isolated from natural sources or one which has been induced by artificial mutation.

The useful yeasts are those belonging to the genera of *Brettanomyces, Candida Trichosporon, Pichia, Debaryomyces, Hansenula, Toralopsis, Endomycopsis, Saccharomyces, Kloeckera* and so forth. The useful bacteria are those belonging to the genera of *Brevibacterium, Escherichia, Corynebacterium, Arthrobater, Alkaligenes, Achromobater, Micrococcus* and so forth. As the useful molds, those of the genera of *Aspergillus, Penicillium, Mucor* and the like can be employed.

Examples of the species of these genera are such yeast species as *Brettanomyces claussenii, Candida rugosa, Candida lipolytica, Candida chalmersii, Candida tropicalis, Candida guilliermondii, Candida parapsilosis, Candida albicans, Trichosporon behrendii, Pichia farinosa, Pichia haplophila, Debaryomyces hansenii, Debaryomyces kloeckeri, Hansenula subpelliculosa, Hansenula miso, Hansenula saturnus, Torulopsis famata, Torulopsis candida, Saccharomyces acidifaciens, Saccharomyces cerevisiae, Saccharomyces willianus, Kloeckera apiculata,* such bacterium species as *Brevibacterium thiogenitalis, Brevibacterium ammoniagenes, Brevibacterium flavum, Brevibacterium devaricatum, Micrococcus glutamicus, micrococcus ammoniaphilum, Corynebacterium facians, Corynebacterium hydrocarboclastus, Arthrobacter* species, *Achromobacter nucleoacidives, Alkaligenes martiarie,* such mold species as *Aspergillus niger, Aspergillus oryzae, Aspergillus saitoi, Aspergillus glaucus, Penicillium elegans, Penicillium citrinum, Mucor pyriformis* and so forth.

Among the citric acid-antimetabolites and their precursors which can be employed in this invention are halogeno-lower alkylacarboxylic acids, the corresponding ketocarboxylic acids, and their salts, esters and water-soluble amides.

More particularly, the antimetabolite may, for example, be a halogenocitric acid such as monofluorocitric acid, monochlorocitric acid or its salt, amide or ester.

The precursor of such an antimetabolite may, for example, be a halogenoacetic acid such as monofluoroacetic acid, monochloroacetic acid, halogenopyruvic acid such as monochloropyruvic acid, halogenooxal acetic acid such as fluorooxal acetic acid, halogenosuccinic acid such as monofluorosuccinic acid, or its salt, amide, esters, such as monofluoroacetamide and monofluoroacetyl coenzyme A.

In order to isolate or select a suitable microorganism from natural sources or from among the artificially induced mutants, the following procedure, for instance, is preferably employed. Namely both a culture medium containing, as added, a citric acid antimetabolite or a precursor thereof and a culture medium free from such an antimetabolite or precursor are respectively inoculated with a microorganisms, and a microorganism whose growth is inhibited on the former medium but which grows well on the latter medium is selected.

To obtain a microorganism having such characters by induced mutation, a treatment with high energy radiation, for example, ultraviolet ray, $Co^{60}$-rays, X-rays, etc., or a treatment with a suitable chemical mutagen such as, for example, sodium nitrite, hydroxylamine, N-methyl-N'-nitro-N-nitrosoguanidine, acriflavin, 8-azaguanine or nitrogen mustard can be utilized to advantage. Among the microorganisms thus obtained, there may be strains which have simultaneously undergone certain physiological or morphological mutations such as the aquistion of nutritional requirements for vitamins, amino acids, nucleic acids, etc. and lack of respiration, but even such strains may be employed in this invention insofar as their growth is inhibited by a citric acid-antimetabolite or its precursor and, at the same time they have a capacity to accumulate citric acid.

In the present invention, a microorganism having the afore-described characters is cultivated on a culture medium. The medium is usually an aqueous medium and may be incubated by either the stationary culture method or the shake culture method.

Generally, submerged culture with aeration and agitation is preferred. Incorporated in the medium are carbon sources, nitrogen sources, and other minor growth elements.

Among the carbon sources are any and all of those assimilable by the particular microorganism being employed, such as glucose, glycerin, organic acids, etc. but from industrial point of view hydrocarbons are most advantageous. As hydrocarbons, n-alkanes having 10 to 20 carbon atoms, either alone or in combination, and materials containing such hydrocarbons may be employed.

Among useful nitrogen sources are organic and inorganic materials such as many ammonium salts, nitrates, amino nitrogen compounds, as well as a number of natural substance inclusive of dry yeast, meat extract, soybean meal, fish meal, corn steep liquor, distillers wastes and the like. In addition to those nutrients, inorganic and organic metal salts such as the salts of iron, magnesium, calcium, manganese, etc. may be incorporated in the medium as required.

When the mutant to be employed has a nutritional requirement, a suitable amount of the particular nutrient may be added to the medium.

The organism is cultivated on such a medium at pH 2 to 8, desirably, between pH 4 and pH 7, and at a temperature of 20° to 35°, desirably between 25° and 30°C.

During the cultivation, it may be expedient to incorporate, if required, an antifoaming agent which is not inhibitory to the fermentation, such as silicone oil, polyoxypropylene derivatives, soybean oil and the like.

In this manner, a significant amount of citric acid is accumulated in the fermentation broth.

This broth is free from isocitric acid and other by-products or contains only trace amounts of them.

Therefore, critic acid can be removed as crystals by routine citric acid recovery procedures, used either alone or in a suitable combination.

Presently-preferred embodiments of the invention are shown in the following examples, but they are not to be construed as limitations of the present invention. Throughout the specification, percentages are calculated on the weight per volume basis, and yields are calculated on weight of produced citric acid per weight of consumed carbon sources.

The relationship between part(s) by weight and part(s) by volume is the same as that between gram(s) and milliliter(s).

The IFO numbers put after the name of the microorganisms employed in the examples are the respective accession numbers at Institute for Fermentation, Osaka, Japan.

Example 1

1. Selection of microorganisms

A slant culture of Candida lipolytica IFO 1437 on a malt agar medium is suspended in sterile physiological saline to a viable count of about $10^7$–$10^8$ cells/ml. 10 ml. of the suspension is spread in a Petri dish and irradiated with ultraviolet ray with U.V. lamp of 30 watt at a distance of 30 cm. for 30 seconds.

0.25 ml. of the irradiated suspension is planted on a malt agar medium, which is then incubated at 28°C for about 30 hours. Then, this inoculum is transplanted by the replica plate method on a medium (A) composed of sodium acetate (0.5 percent), $KH_2PO_4$(0.1 percent), $NH_4NO_3$(0.1 percent), $NH_4Cl$(0.1 percent), $MgSO_4 \cdot 7H_2O$ (0.05 percent), thiamine (0.1 mg/l) and agar (2.2 percent), and on a similar medium (B), composed of ingredients of medium (A) plus sodium monofluoroacetate 0.1 percent. The two media are incubated at 28°C for 48 hours. From among the colonies which grow on medium (A) but do not appear on medium (B) a mutant strain F-12 (ATCC 20320) is obtained.

2. Production of citric acid

Then, the parent strain and the mutant are respectively used to inoculate a fermenter containing 120 parts by volume each of an aqueous medium, composed of n-hexadecane (6 percent), $KH_2PO_4$ (0.01 percent), $MgSO_4 \cdot 7H_2O$ (0.05 percent), dry yeast (0.1 percent), and $(NH_4)_2SO_4$ (0.3 percent) and thereto added $CaCO_3$ (5 percent) which has been separately sterilized under dry conditions.

The microorganisms are incubated at 28° C for 6 days to produce citric acid. The results are set forth below.

| Parent strain | Citric acid 42 mg./ml. | (+)-Isocitric acid 31 mg./ml. |
|---|---|---|
| Mutant strain | 78 mg./ml. | 2.5 mg./ml. |

To 100 parts by volume each of the cultures of those two strains is added $Ca(OH)_2$ until pH 7.0 is reached.

The respective broths are then heated to 80°C for 60 minutes and, while hot, centrifuged to remove the supernatant fluid. The sediments are dissolved with sulfuric acid. The resulting calcium sulfate and yeast cells are removed by centrifugation to give supernatant fluid, which is passed through a column of 5 parts by volume of Amberlite IR-120($H^+$) (Rohm and Haas Company). After addition of 1 part by weight of activated carbon, the effluant is filtered and the resulting filtrate is concentrated under reduced pressure to give a syrupy consistent matter and allowed to stand overnight in a refrigerator.

The procedure gives 5.4 parts by weight of crystals from the culture broth of the mutant. A similar treatment of the mother liquid gives another 1.2 part by weight of crystals.

On the other hand, the same procedure gives substantially no crystals from the culture broth of the parent strain. So, the broth is brought to pH 3.5 by the dropwise addition of 30% KOH and allowed to stand overnight in a refrigerator. The precipitates are then removed and small amount of seed crystals of citric acid is added to the mother liquid, whereupon 2.8 parts by weight of citric acid crystals is obtained.

Example 2

*Debaryomyces sp.* (IFO 0064) and *Pichia haplophila* (IFO 0947) are subjected to the same mutagenic treatment as described in Example 1. The resulting mutant HF-79(IFO 1547) of the parent strain *Pichia haplophila* (IFO 0947) and the mutant DF-04(IFO 1546) of a *Debaryomyces sp.* (IFO 0064) are cultivated in the same manner as in Example 1. The results are set forth below.

| Strain | Citric acid mg./ml. |
|---|---|
| *Pichia haplophila* (IFO 0947) | 7 |
| *Debaryomyces sp.* (IFO 0064) | 0.4 |
| *Pichia haplophila* HF-79, IFO 1547 (ATCC 20321) | 48 |
| *Debaryomyes sp.* DE-04(ATCC 20322) | 36 |

Example 3

*Brettanomyces clausseni* (IFO 0627) is subjected to the same mutagenic treatment as described in Example 1. The resulting mutant strain BN-62 (ATCC 20323) has an improved capacity to produce citric acid.

The two strains are respectively cultivated on a medium similar to that used in Example 1, except that the carbon source has been replaced with glucose 10 percent. The procedure gives the following results.

| | Citric acid |
|---|---|
| Parent strain IFO 0627 | 45 mg./ml. |
| Mutant strain IFO 1544 ATCC 20323 | 73 mg./ml. |

Example 4

A cell suspension of *Brevibacterium flavum* No. 1511 (ATCC 14067) is irradiated with ultraviolet ray in the same manner as in Example 1 to obtain a fluoroacetic acid-sensitive mutant BF-11(ATCC 21682).

This mutant and the parent strain are respectively cultivated on the same medium as in Example 3. It is found that whereas the parent strain does not accumulate detectable amount of citric acid in the cultured broth, the mutant strain accumulates 45 mg./ml. of citric acid.

Example 5

*Achromobacter nucleoacidoves* No. 106 (IFO 13268) and *Corynebacterium fascians* No. 803 (ATCC 21461) are irradiated with ultraviolet rays as in Example 1 to obtain fluorocitric acid-sensitive strains NF-06 (ATCC 21683) and CF-03 (ATCC 21684), respectively. Those strains are respectively used to inoculate a fermenter containing 120 parts by volume a medium (pH 7.0) containing n-paraffin (a mixture of $C_{12}$–$C_{15}$) 6%, $NH_4NO_3$ 0.5%, $KH_2PO_4$ 0.2%, $MgSO_4$ 0.05%, $FeSO_4 \cdot 7H_2O$ 0.01%, urea 0.1%, dry yeast 0.1% and $CaCO_3$ 4% and incubated at 28°C for 5 days.

The results are as shown below

| Parent strains | |
|---|---|
| No. 106 | 0.6 mg./ml. |
| No. 803 | 43 mg./ml. |
| Mutants | |
| NF-06(ATCC 21683) | 72 mg./ml. |
| CF-03(ATCC 21684) | 61 mg./ml. |

Example 6

A suspension of the spores of *Penicillium chermisinum* IFO-5800 is treated in the same manner as described in Example 4 to obtain a fluoroacetic acid-sensitive mutant PF-100 (ATCC 20325).

The parent strain and the mutant are respectively used to inoculate a fermenter containing 120 parts by volume of an aqueous medium (pH 7.0) containing n-paraffin 10%, $NH_4NO_3$ 0.1%, $MgSO_4$ 0.02%, $KH_2PO_4$ 0.03%, $Na_2HPO_4 \cdot 12H_2O$ 0.03%, and $CaCO_3$ 4% (ph 5.0) and incubated at 28°C for 14 days.

Excellent results are obtained by the above procedure.

| | Citric acid |
|---|---|
| Parent strain | 32 mg./ml. |
| Mutant | 77 mg./ml. |

Example 7

*Arthrobactor paraffineus* ATCC 15591 is treated in the same manner to obtain *Arthrobacter paraffineus* No. AF-51 (ATCC 21685), a fluoroacetic acid-sensitive mutant.

The parent strain and the mutant are respectively incubated at 28°C for 3 days in 120 parts by volume of an aqueous medium (Ph 7.0) containing n-hexadecane 4 percent, sodium acetate 0.1%, $NH_4NO_3$ 0.3%, urea 0.05%, CSL 0.01%, $MgSO_4 \cdot 7H_2O$ 0.05%, $MnSO_4$ 0.001%, $FeSO_4 \cdot 7H_2O$ 0.01%, $KH_2PO_4$ 0.05%, $K_2HPO_4$ 0.15% and $CaCO_3$ 3%.

The mutant strain accumulates 28 mg./ml. of citric acid, while the parent strain accumulates 0.9 mg./ml. of the same.

Example 8

In comparison of parent strains, the growth of mutant strains employed in Examples 1 to 9 is examined under following conditions.

1. Medium:
   Besal composition
   $(NH_4)_2SO_4$ 0.3%, $NH_4NO_3$ 0.3%, $KH_2PO_4$ 0.2%, $K_2HPO_4$ 0.2%, $MgSO_4 \cdot 7H_2O$ 0.05%, $FeSO_4 \cdot 7H_2O$ 0.0003%, $MNSO_4 \cdot 4H_2O$ 0.0003%, $CaCl_2 \cdot 2H_2O$ 0.0001%, CSL 0.1%, Lard oil 0.05%
   Medium (I)

basal medium + sodium acetate 1%

Medium (II)
  basal medium + glucose 1%

Medium (III)
  basal medium + yeast extract 0.2%

2. Citric acid - antimetabolite or its precursor:
  30 mM of fluoroacetic acid or fluorocitric acid is added to the media 3. Incubation condition:
  28°C, 48 hours 4. Determination of growth:
  Dried cell weight is checked.

5. Result:

| Mutant strain | Medium | antimetabolite or its precursor employed ** | Growth (%)* |
|---|---|---|---|
| Candida lipolytica F-12(ATCC 20320) | (I) | FAA | 13 |
| Pichia haplophila HF-79(ATCC 20321) | (II) | FAA | 21 |
| Debaryomyces sp. (ATCC 20322) | (II) | FAA | 36 |
| Brettanomyces claussenii BN-62 (ATCC 20323) | (II) | FAA | 42 |
| Brevibacterium flavum BF-11(ATCC 21682) | (I) | FAA | 17 |
| Achromobacter nucleoacideves NF-06 (ATCC 21683) | (III) | FCA | 32 |
| Corynebacterium facians CF-03 (ATCC 21684) | (III) | FCA | 60 |
| Penicillium chermisinum PF-100 (ATCC 20325) | (I) | FAA | 63 |
| Arthrobacter paraffineus No. AF-SI (ATCC 21685) | (I) | FAA | 41 |
| Candida lipolytica S-22 (ATCC 20324) | (I) | FAA | 12 |

*Calculated on the basis of cell weight of the parent strain cultured under the same condition.
**FAA: fluoroacetic acid; FCA: fluorocitric acid

What we claim is:

1. A method for producing citric acid, which comprises incubating a microorganism of the genus *Candida, Pichia, Debaryomyces, Bretanomyces, Brevibacterium, Corynebacteriym, Arthrobacter, Achromobacter*, or *Penicillium*, whose growth is inhibited by a citric acid antimetabolite or a precursor thereof selected from class consisting of halogenocitric acid, halogenoacetic acid, halogenopyruvic acid, halogenooxalacetic acid and halogenosuccinic acid, and which is capable of accumulating a significant amount of citric acid in a culture medium containing neither said antimetabolite nor precursor, and then recovering citric acid thus accumulated from said medium.

2. A method according to claim 1, wherein said microorganism is *Candida lipolytica* (ATCC 20320).

3. A method according to claim 1, wherein said microorganism is *Candida lipolytica* (ATCC 20324).

4. A method according to claim 1, wherein said microorganism is *Pichia haplophila* (ATCC 20321).

5. A method according to claim 1, wherein said microorganism is *Debaryomyces sp.* (ATCC 20322).

6. A method according to claim 1, wherein said microorganism is *Brettanomyces claussenii* (ATCC 20323).

7. A method according to claim 1, wherein said microorganism is *Brevibacterium flavum* (ATCC 21682).

8. A method according to claim 1, wherein said microorganism is *Achromobater nueleoacedives* (ATCC 21683).

9. A method according to claim 1, wherein said microorganism is *Corynebacterium fascians* (ATCC 21684).

10. A method according to claim 1, wherein said microorganism is *Arthrobacter paraffineus* (ATCC 21685).

11. A method according to claim 1 wherein said microorganism is *Penicillium chermisinum* (ATCC 20325).

12. A method according to claim 1, wherein the incubation temperature is between 20° and 35°C.

13. A method according to claim 1, wherein the incubation pH is between 2 and 8.

14. A method for producing citric acid which comprises inoculating both medium (A) containing a citric acid-antimetabolite or a precursor thereof selected from the class consisting of halogenocitric acid, halogenoacetic acid, halogenopyruvic acid, halogenooxalacetic acid and halogenosuccinic acid and medium (B) free from such an antimetabolite or a precursor with a microorganism of the genus *Candida, Pichia, Debaryomyces, Brettanomyces, Brevibacterium, Corynebacterium, Arthrobacter, Achromobacter* or *Penicillium* to select a strain whose growth is inhibited on the medium (A) but which grows well on the medium B; then incubating this particular strain in a medium to cause the same to accumulate citric acid in the medium containing neither said citric acid-antimethabolite nor precursor, and finally recovering the citric acid thus accumulated from said medium.

15. A method according to claim 14 wherein said microorganism is *Candida lipolytica* (ATCC 20320).

16. A method according to claim 14, wherein said microorganism is *Candida lipolytica* (ATCC 20324).

17. A method according to claim 14, wherein said microorganism is *Pichia haplophila* (ATCC 20321).

18. A method according to claim 14, wherein said microorganism is *Debaryomyces sp.* (ATCC 20322).

19. A method according to claim 14, wherein said microorganism is *Brettanomyces claussenii* (ATCC 20323).

20. A method according to claim 14, wherein said microorganism is *Brevibacterium flavum* (ATCC 21682).

21. A method according to claim 14 wherein said microorganism is *Achromobacter nueleoacidives* (ATCC 21683).

22. A method according to claim 14 wherein said microorganism is *Corynebacterium fascians* (ATCC 21684).

23. A method according to claim 14 wherein said microorganism is *Arthrobacter paraffineus* (ATCC 21685).

24. A method according to claim 14, wherein said microorganism is *Penicillium chermisinum* (ATCC 20325).

25. A method according to claim 14 wherein the incubation temperature is between 20° and 35°C.

26. A method according to claim 14, wherein the incubation pH is between 2 and 8.

* * * * *